United States Patent [19]
Merchant et al.

[11] Patent Number: 5,933,413
[45] Date of Patent: Aug. 3, 1999

[54] ADAPTIVE PRIORITY DETERMINATION FOR SERVICING TRANSMIT AND RECEIVE IN NETWORK CONTROLLERS

[75] Inventors: Shashank C. Merchant, Sunnyvale; Jeffrey Roy Dwork, San Jose, both of Calif.

[73] Assignee: Advanced Micro Devices, Inc., Sunnyvale, Calif.

[21] Appl. No.: 08/782,271

[22] Filed: Jan. 13, 1997

[51] Int. Cl.⁶ .................................................. H04L 12/54
[52] U.S. Cl. .......................................... 370/234; 370/413
[58] Field of Search ..................... 370/229, 230, 370/231, 232, 233, 234, 235, 236, 412, 413, 414, 415, 416, 417, 418; 395/200.5, 200.56, 200.62, 200.63, 200.64, 200.65, 200.7, 200.8, 200.83, 200.43, 872, 873, 876, 877

[56] References Cited

U.S. PATENT DOCUMENTS

| | | | |
|---|---|---|---|
| 4,839,891 | 6/1989 | Kobayashi et al. | 370/231 |
| 4,942,553 | 7/1990 | Dalrymple et al. | 395/877 |
| 5,136,582 | 8/1992 | Firoozmand | 370/400 |
| 5,210,749 | 5/1993 | Firoozmand | 370/463 |
| 5,293,487 | 3/1994 | Russo et al. | 395/200.8 |
| 5,440,691 | 8/1995 | Carrafiello et al. | 395/200.64 |
| 5,682,552 | 10/1997 | Kuboki et al. | 395/872 |

OTHER PUBLICATIONS

AMD, AM79C971 PCnet™–FAST Single–Chip Full–Duplex 10/100 Mbps Ethernet Controller for PCI Local Bus, May 1996.

*Primary Examiner*—Chi H. Pham
*Assistant Examiner*—Kwang B. Yao

[57] ABSTRACT

A network interface stores data frames between a host computer and a network in a buffer memory. The network interface stores data frames received from the host computer via a peripheral component interconnect (PCI) bus in a transmit buffer for transmission on the network. The network interface also stores data from the network in a receive buffer for transfer to a host computer memory via the PCI bus. A priority control selectively allocates host computer resources based on network transmission and network reception by the network interface, and based on available space in the receive buffer, available data in the transmit buffer, and the estimated length of data packets received from the network. The selective allocation of host computer resources minimizes transmit buffer underflow and receive buffer overflow.

16 Claims, 8 Drawing Sheets

| Figure 1A |
| Figure 1B |

ADAPTIVE PRIORITY DETERMINATION FOR SERVICING TRANSMIT AND RECEIVE IN NETWORK CONTROLLERS

FIELD OF THE INVENTION

The present invention relates to network interface devices between host computers and network communication lines. More particularly, the invention relates to minimizing transmit underflow and receive overflow of data packets transmitted between a host computer and a network.

DESCRIPTION OF THE RELATED ART

Network interface devices handle packets of data for transmission and reception between a host computer and a network communication system, such as a local area network. One primary function of the network interface, also referred to as a network controller, is to buffer data to compensate for timing discrepancies between the host computer and the network.

U.S. Pat. No. 5,210,749 to Firoozmand, the disclosure of which is incorporated in its entirety by reference, discloses a conventional network controller comprising a buffer memory configured as logical first-in-first-out memories (FIFOs) for storing transmit and receive data. The data is transmitted from the transmit FIFOs to the network before a full frame of data is received from the host system memory.

The throughput of the network controller is the rate at which the network controller is able to transfer data in both directions between the host computer and the network. The latency of the network controller is the time delay between the time data is first "given" to the network controller and the time the data "appears" on the network, or vice versa.

The length of each data frame received from a host computer may vary. Hence, Firoozmand proposes a transmit data threshold detecting means for detecting presence in the transmit FIFO of at least a predetermined amount of data, less than the full frame, that is sufficient to enable the frame to become completed while the data in the buffer is being transferred to the network. The predetermined transmit data threshold, selected in part by system and network latencies, is the amount of data stored in the transmit FIFO sufficient to prevent data "underrunning", i.e., running out of data in the transmit FIFO, during transfer of data from the FIFO to the network. Hence, data is transmitted from the transmit FIFO to the network when the transmit data threshold detecting means detects the presence of data in the transmit FIFO equal to the predetermined transmit data threshold.

There exists a problem, however, in that detection of the transmit FIFO containing data at the predetermined transmit data threshold may not be entirely satisfactory. As noted earlier, different packet sizes are transmitted between the network interface and the host computer. Hence, the predetermined transmit data threshold does not entirely eliminate underflow and latency among the different packet sizes actually implemented. If the threshold is too high, packet latency can still be a problem.

In addition, problems may arise if the time to load bytes into the transmit FIFO is variable. For example, the network interface may be coupled to a system bus, such as a peripheral component interconnect (PCI) bus.

The network interface may need to contend for access of the system bus in order to transmit data from the host computer to the transmit FIFO. In addition, the network interface may need to contend for access in order to transmit data received from the network and stored in a receive buffer. Hence, if data is not removed from the receive buffer in a timely manner, an overflow of the receive buffer may occur. Conversely, if transmit data from the host computer system is not transferred to the transmit buffer in a timely manner, transmit underflow may occur, requiring retransmission by the network interface of a data packet onto the network.

DISCLOSURE OF THE INVENTION

There is a need for a network interface capable of allocating bus interface and buffer resources in a host computer system to improve network and system throughput.

There is also a need for a method of determining efficient use of buffer space which provides higher system and network utilization based on prescribed conditions.

There is also a need for an arrangement for selectively allocating host computer resources for storing transmit data bytes into a buffer or removing receive data bytes from the buffer, based upon available space in the receive buffer, the number of transmit bytes stored in the buffer, and the transmission and reception status of data packets on the network media.

These and other needs are met by the present invention, in which host computer system resources are allocated to selectively transfer transmit and receive data to and from a buffer based on network activity and buffer status, where a transmit or receive priority may be selected to ensure minimal buffer overflow and underflow.

In one aspect of the invention, a network interface having at least one memory buffer and transmitting and/or receiving data packets between a network and a host computer uses a method for allocating host computer resources. The method includes the steps of determining the occurrence of at least one of transmitting and receiving of data packets on the network by the network interface, and based on the determined occurrence, selectively allocating host computer resources for one of (1) storing first data bytes from the host computer into the memory buffer for transmission onto the network, and (2) removing second data bytes, obtained from the receiving of the data packets, from the memory buffer for transfer to the host computer. The method effectively prioritizes the host computer resources for either storing the first data bytes into the memory buffer or removing the second data bytes from the memory buffer, based upon the coincident transmission or reception of data packets by the network interface. Hence, the method ensures that overflow of the buffer for received data and underflow of transmit data is minimized.

In another aspect of the invention, a network interface includes a computer bus interface configured for exchanging data frames with a host computer, each of the data frames comprising a plurality of data bytes, a network bus interface configured for outputting data packets carrying first data bytes onto a network medium at a network transmission rate and receiving data packets carrying second data bytes from the network medium, at least one memory buffer connected for receiving the first data bytes from the computer bus interface and the second data bytes from the network bus interface, the memory buffer having predetermined byte storage requirements before output of the first and second data bytes, respectively, and a buffer controller selectively allocating host computer resources to one of (1) transfer the first bytes from the host computer to the memory buffer via the computer bus interface, and (2) transfer the second bytes from the memory buffer to the host computer via the system bus, based on detection of transmission and/or reception of data packets by the network bus interface and the respective number of first and second data bytes stored in the memory buffer.

Additional objects, advantages and novel features of this invention will be set forth in part in the description which follows, and in part, will become apparent to those skilled in the art upon examination or may be learned by practice of the invention. The objects and advantages of the invention may be realized and obtained by means of the instrumentalities and combinations particularly pointed out in the appended claims.

BEST MODE FOR CARRYING OUT THE INVENTION

Figures 1, 1A:
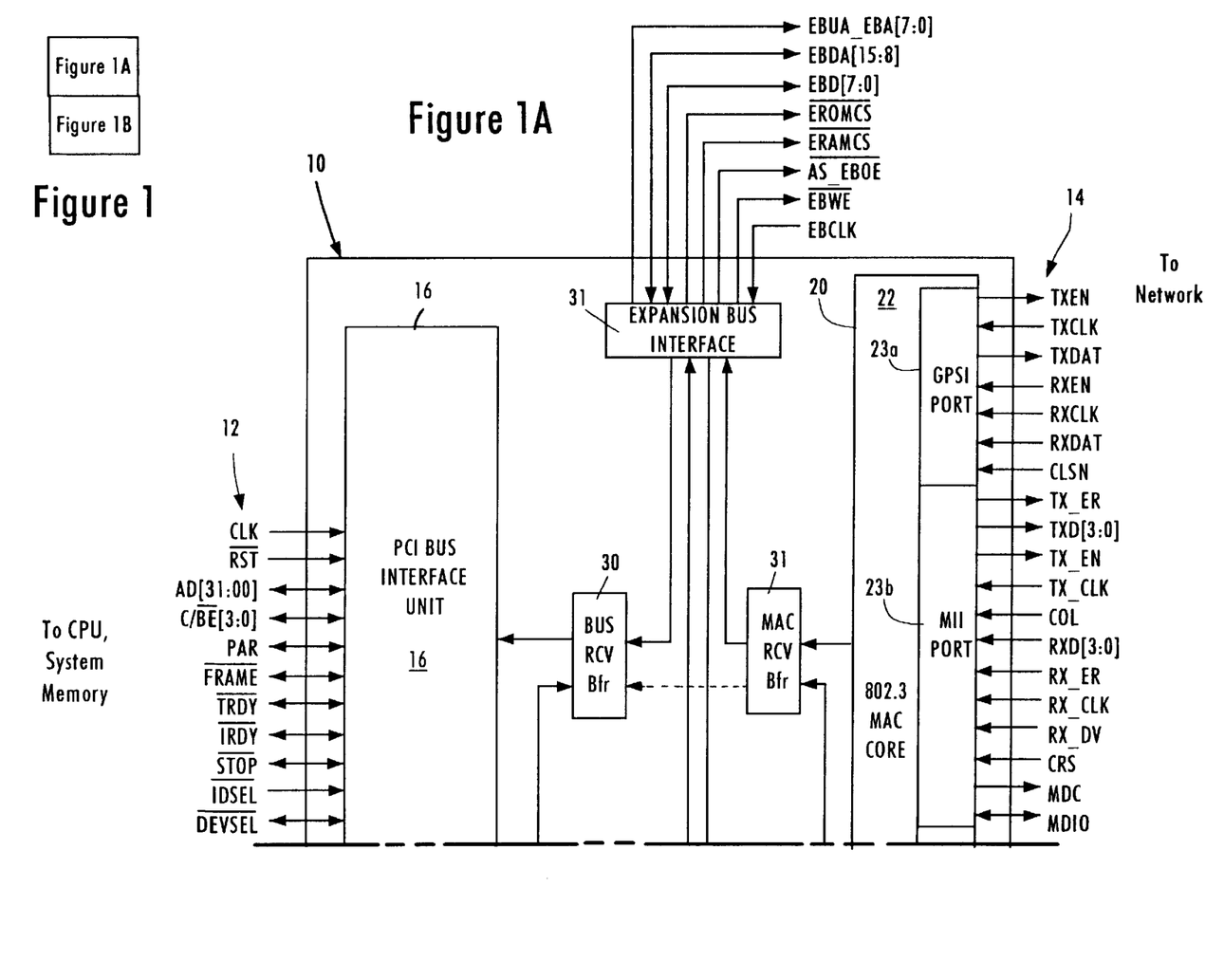
FIG. 1 is a block diagram of a network interface according to an embodiment of the present invention.
Figure 1B:
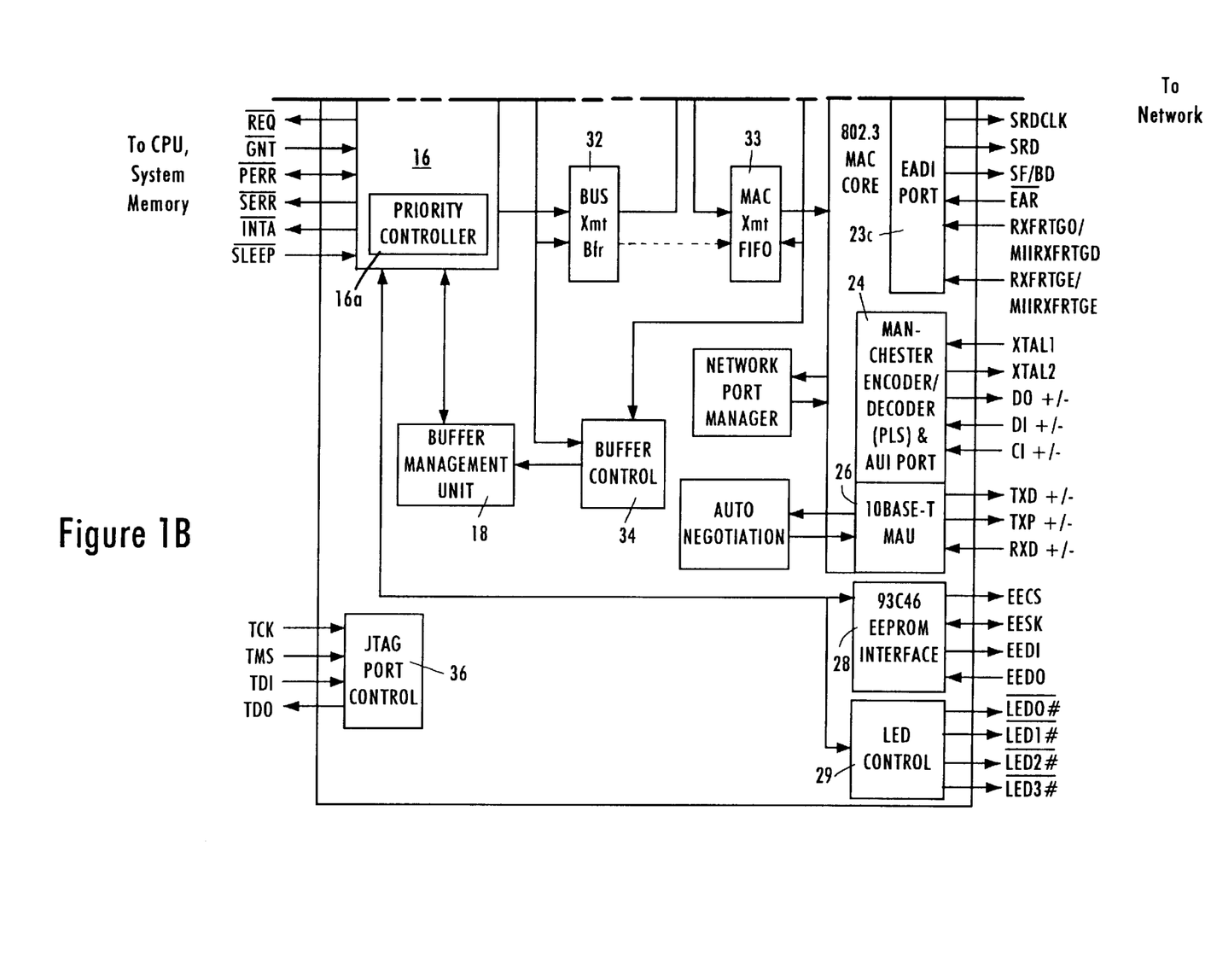

FIG. 1 is a block diagram of an exemplary network interface 10 that transmits and receives data between a host computer and media of an Ethernet (ANTI/IEEE 802.3) network according to an embodiment of the present invention.

Network interface 10, preferably a single-chip, 32-bit Ethernet controller, provides an interface between a local bus 12 of a host computer, for example, a peripheral component interconnect (PCI) local bus, and an Ethernet-based media 50. An exemplary network interface is the Am79C971 PCnet™-FAST Single-chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif., the disclosure of which is incorporated in its entirety by reference.

Network interface 10 includes a computer bus interface unit 16, a direct memory access (DMA) buffer management unit 18, and a network bus interface 20. The network bus interface 20 selectively operates in either half-duplex mode or full-duplex mode according to IEEE 802.3x[2]. Network bus interface 20 includes a media access control (MAC) core 22, a General Purpose Serial Interface (GPSI) 23a, a Media Independent Interface (MII) 23b for connecting external 10 MBit/s or 100 MBit/s transceivers, an External Address Detection Interface (EADI) 23c, an attachment unit interface (AUI) 24, and a twisted-pair transceiver media attachment unit (10BASE-T MAU) 26. The AUI port 24 follows the specification ISO/IEC 8802.3 (IEEE-ANTI 802.3). Network interface 10 also includes an EEPROM interface 28, an LED control 29, and an expansion bus interface 31 for boot RAM (e.g., EEPROM or Flash Memory) during startup, and an IEEE 1149.1-compliant JTAG Boundary Scan test access port interface 36. Full-duplex operation can be performed by any of the AUI, GPSI, 10BASE-T and MII interfaces. Additional details of these interfaces are disclosed in the above-referenced Am79C971 Preliminary Data Sheet.

Network station 10 also includes a PCI bus receive buffer 30, a MAC receive buffer 31, a PCI bus transmit buffer 32, a MAC transmit buffer 33, and a buffer controller 34.

The computer bus interface 16, also referred to as PCI bus interface unit 16 (PCI BIU), is compliant with the PCI local bus specification (revision 2.1) and receives data frames from a host computer's CPU via the PCI bus 12. PCI bus interface unit 16, under the control of buffer management unit 18, transfers the data frames from the system memory (not shown) to transmit buffer 32 via PCI bus 12. The data frames received from PCI bus interface unit 16 are passed to PCI bus transmit buffer 32, and subsequently to the MAC transmit buffer 33.

Buffer management unit 18 manages the reception of the data by PCI bus interface unit 16 and retrieves information from header bytes that are transmitted at the beginning of transmissions from the CPU via PCI bus 12.

Figure 8:
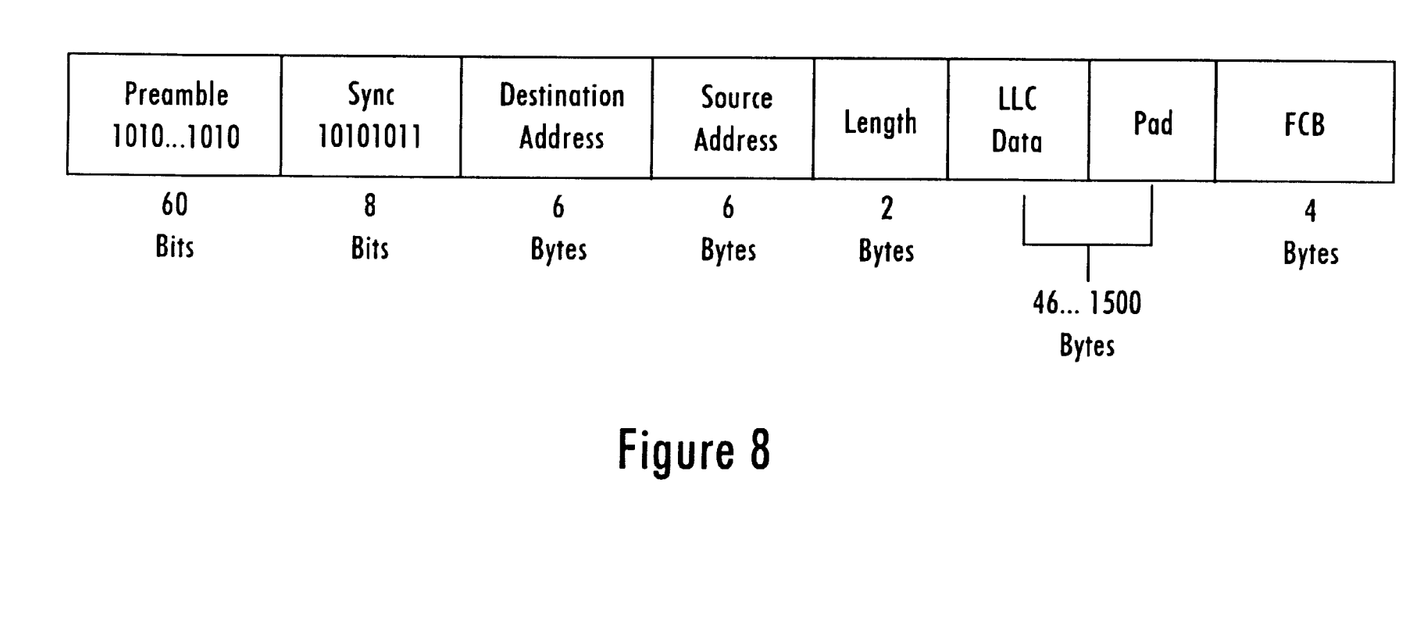
FIG. 8 shows the format of a data packet transmitted by the network interface of FIG. 1.

Network bus interface 20 transmits a complete frame of data as a data packet on network bus 14. As shown in FIG. 8, the data packet transmitted by network interface 20 onto network bus 14 may include the LLC data and pad fields of a size varying from 46 to 1500 bytes, such that the final packet length may vary from a minimum of 64 bytes to a maximum 1518 bytes.

Transmit underflow may occur when the data from transmit buffer 32 is removed at a rate faster than the rate at which data is transferred from the system memory via the PCI bus 12 into the transmit buffer 32. Specifically, underflow can occur during transmission of a data packet when the transmit buffer 32 does not have any more data bytes to transmit for the current packet being transmitted onto the network, resulting in a retransmission request that wastes network bandwidth and degrades performance. To avoid underflow, packet transmission by the network interface 10 is initiated after there are a sufficient number of bytes in the transmit buffer 32. However, if the threshold is too high, then packet latency will increase. Similarly, receive overflow may occur when data is supplied to the receive buffer 30 from the MAC 22 at a rate faster than the transfer rate from the receive buffer 30 to the system memory via the PCI bus 12.

According to the present invention, host computer system resources (e.g., data transfer on the PCI bus 12) are selectively allocated to receive and transmit buffers of network interfaces to optimize host system and network throughput. For example, the disclosed arrangement may allocate host system resources to the receive buffer 30, where data in the receive buffer 30 is transferred to a system memory (not shown) via PCI bus 12 to avoid overflow of the receive buffer 30. Alternatively, host system resources may be allocated to the transmit buffer 32, where data is transferred from the system memory to the transmit buffer 32 via the PCI bus 12 to avoid underflow of the transmit buffer 32.

Hence, the disclosed arrangement selectively allocates host computer system resources to either receive data from the network (i.e., empty the receive buffer 30) or transmit data on the network (i.e., transfer data to fill the transmit buffer 32.) The disclosed arrangement provides three states for selectively allocating the host computer resources. The first state grants priority to receive data from the network, where host computer resources are first allocated to empty the receive buffer 30. The second state grants priority to transmit data on the network, where the host computer resources are first allocated to fill the transmit buffer 32. A third state establishes a "don't care priority," where host computer resources are arbitrarily allocated to alternate between the receive and transmit buffers. Hence, host system resources according to the "don't care" state would be first allocated to whichever buffer would initially request processing.

As described below, the disclosed arrangement also may include a mediation state, where the host computer system resources are selectively allocated based upon a comparison of the average transfer rate of the PCI bus 12 with the available space in the receive buffer 30, the number of transmit bytes available in the transmit buffer 32, and the network data rate (also referred to as the wire rate).

Figure 2:
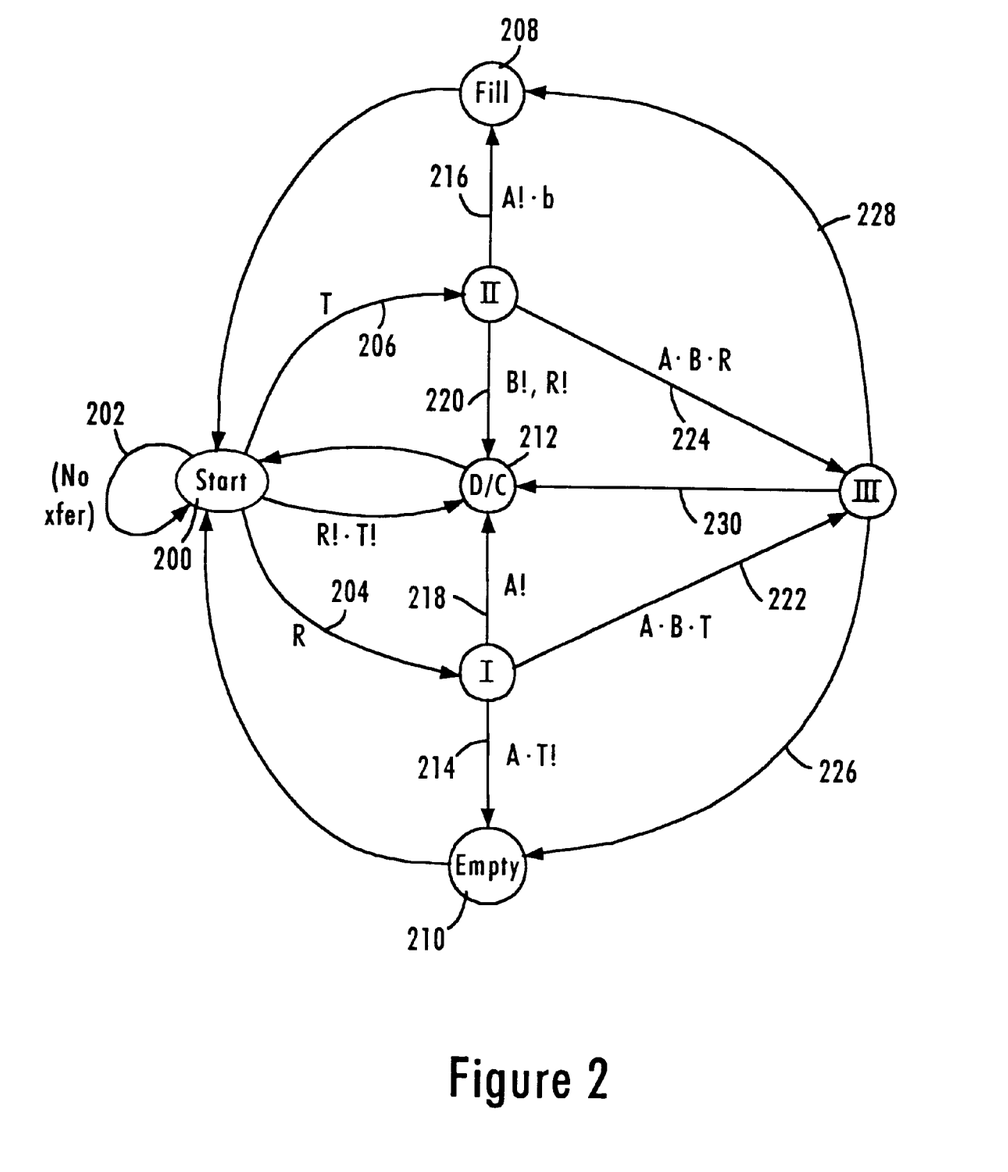
FIG. 2 is a state diagram summarizing the arrangement for selectively allocating host computer resources according to an embodiment of the present invention.

FIG. 2 is a state diagram summarizing the arrangement for allocating system resources based on prescribed conditions. The state diagram of FIG. 2 is preferably implemented within a priority controller 16a of the PCI BIU 16 as a state machine. The state diagram may also be implemented as a series of state machines within the priority controller 16a. The priority controller 16a may also be resident, for example, in the buffer controller 34 or the buffer management unit 18 of FIG. 1, or both.

The state machine of FIG. 2 executes three logical rules to determine whether host computer system resources should be first assigned to either the transmit buffer 32 or the receive buffer 30, i.e., whether to assign a priority to transmit data, or a priority to receive data, respectively. The logical rules specify the priority to be assigned based upon amount of data stored in the transmit buffer 32 and receive buffer 30, respectively, as well as the transmitting or receiving of data packets by the network bus interface 20 coincident with the need for allocating host computer system resources to one of the buffers. For example, if the available space in the receive buffer 30 is less than an estimated length of a data packet from the MAC 22 and the MAC 22 continues to receive data packets from the network media 14, it is preferable to assign priority to the receive buffer 30 in order to avoid overflow. Conversely, if the amount of transmit data in the transmit buffer 32 is relatively low and the MAC 22 is transmitting a data packet on the network media 14, it is preferable to allocate host computer resources to the transmit buffer 32 to avoid transmit underflow.

As shown in FIG. 2, the state machine implemented in the priority controller 16a begins at the start state 200. The state machine remains at the start state 200 while there is no data transfer condition in either the receive buffer 30 or the transmit buffer 32, indicated by path 202. A data transfer condition is indicated in the receive buffer 30 when the buffer control 34 determines that the difference between the read/write pointer of the receive buffer 30 exceeds a predetermined threshold. For example, a buffer controller 34 may include the read/write pointers for the receive buffer 30 and the transmit buffer 32. Alternatively, the PCI bus interface unit 16 may include the read pointer for the receive buffer 30 and the write pointer for the transmit buffer 32, while the network bus interface 20 would include the write pointer for the receive buffer 30 and the read pointer for the transmit buffer 32.

A data transfer condition of the transmit buffer 32 may be detected upon the PCI bus interface unit 16 receiving a transfer request from the host computer via the PCI bus 12, specifying the length of the complete data frame and the address location of the data stored in system memory.

Once the start state 200 has detected a data transfer condition, the start state 200 determines the occurrence of either transmitting of data packets on the network or receiving of data packets from the network (R). If the start state determines that the MAC 22 is receiving data packets (R), the state machine in the priority controller 16a will proceed to state I by a path 204. If the start state determines the MAC 22 is transmitting a data packet (T), the start state proceeds to state II by a path 206. The start state 200 can determine the occurrence of at least one of the transmitting and receiving of the data packets by the MAC 22 by receiving a signal from the MAC 22 indicating its operational status, at which point the start state may select either paths 204 or 206. Note that simultaneous transmission and reception is a feature of full-duplex Ethernet protocol.

Once the state machine is at either state I or state II, the state machine performs additional processing to determine whether to proceed to a fill state 208, granting priority to the transmit buffer (i.e., to "fill" the transmit buffer 32 with transmit data), the "empty" state 210 granting priority to the receive buffer 30 (i.e., to "empty" the receive buffer 30), or a "don't care" (D/C) state 212, where host computer resources are arbitrarily allocated to either the transmit buffer 32 or the receive buffer 30.

Figure 3:
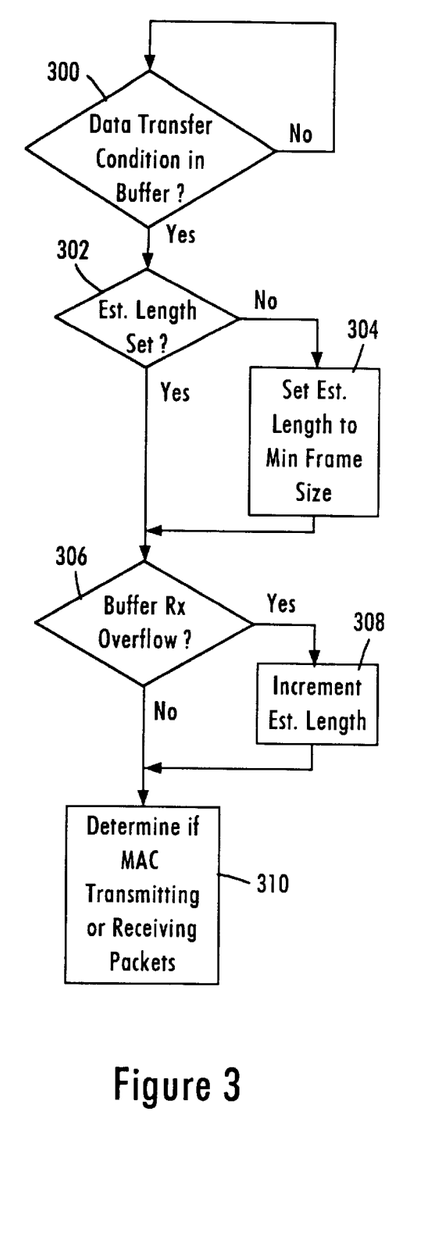
FIG. 3 is a flow diagram illustrating in detail the start state of FIG. 2.

FIG. 3 is a flow diagram illustrating in detail the start state 200. The start state begins in step 300 by determining whether a data transfer condition exists in either the receive buffer 30 or the transmit buffer 32. If no data transfer condition is detected, the start state 200 maintains a wait condition, as indicated by path 202 of FIG. 2.

Upon detecting a data transfer condition for either the receive buffer 30 or the transmit buffer 32, the state machine determines in step 302 whether an estimated length for a data packet from the network is set. Specifically, the disclosed arrangement estimates a length of a data packet received from the network to determine how to selectively allocate resources. The estimated length may be set to a predetermined maximum value specified by the protocol of the network media 14. In addition, the estimated length may be determined by historical analysis of previously-received data packets. In addition, the estimated length may be set by adaptively changing the estimated length based upon the occurrence of overflow conditions in the receive buffer. The steps of FIG. 3 disclose the adaptive approach of estimating the length, although the other two methods may also be used.

As shown in FIG. 3, if an estimated length is not set, then the state machine in the PCI BIU 16 sets the estimated length in step 304 to the minimum frame size, for example 46 bytes. The priority controller 16a uses the minimum frame size as the estimated length until an overflow is detected in the receive buffer 30. Hence, if the priority controller 16a detects in step 306 an overflow at any time, the priority controller 16a automatically increments the estimated length in step 308 by a predetermined amount. The start state 200 then checks in step 310 with the MAC 22 to determine if the MAC 22 is transmitting (T) or receiving (R) data packets on the network media 14.

Figure 5:
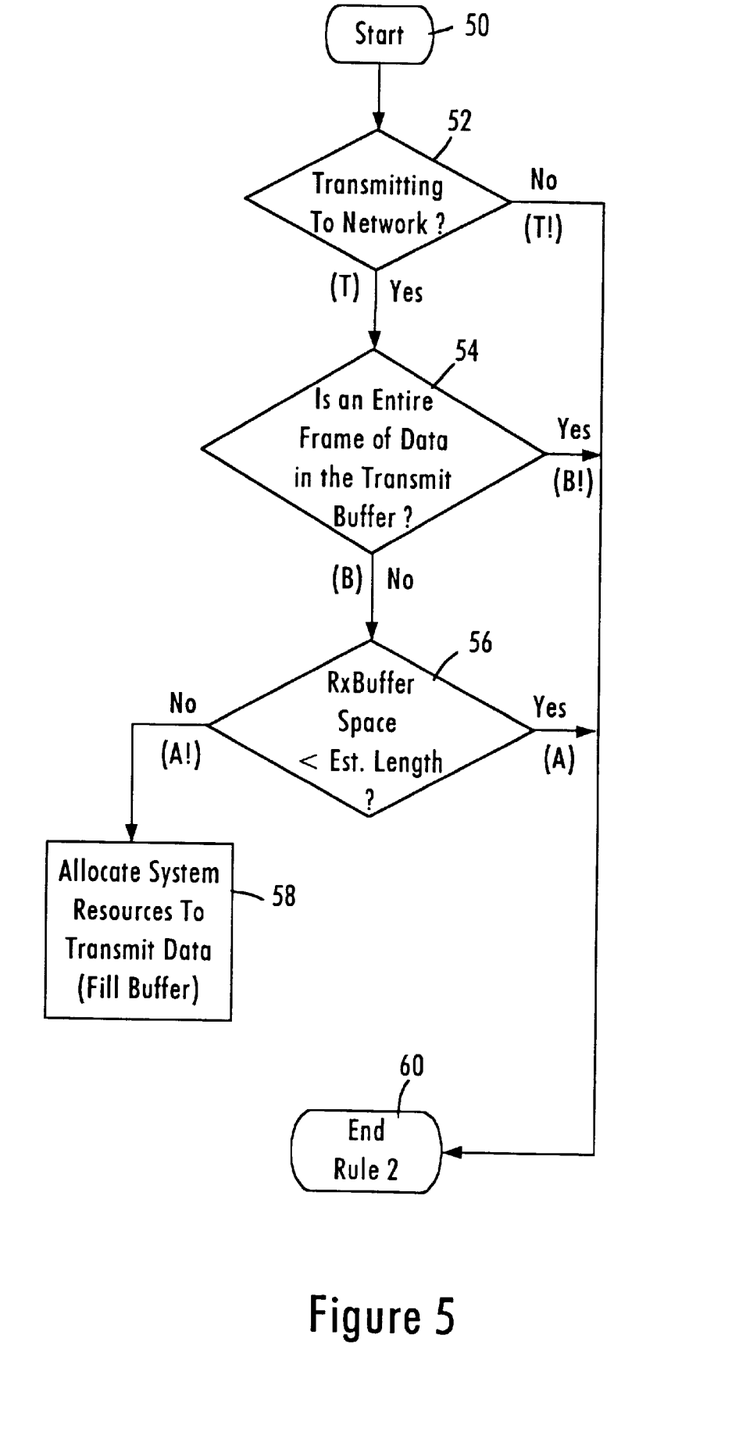
FIG. 5 is a flow diagram illustrating the second rule for determining to assign priority to transmit data.
Figure 6:
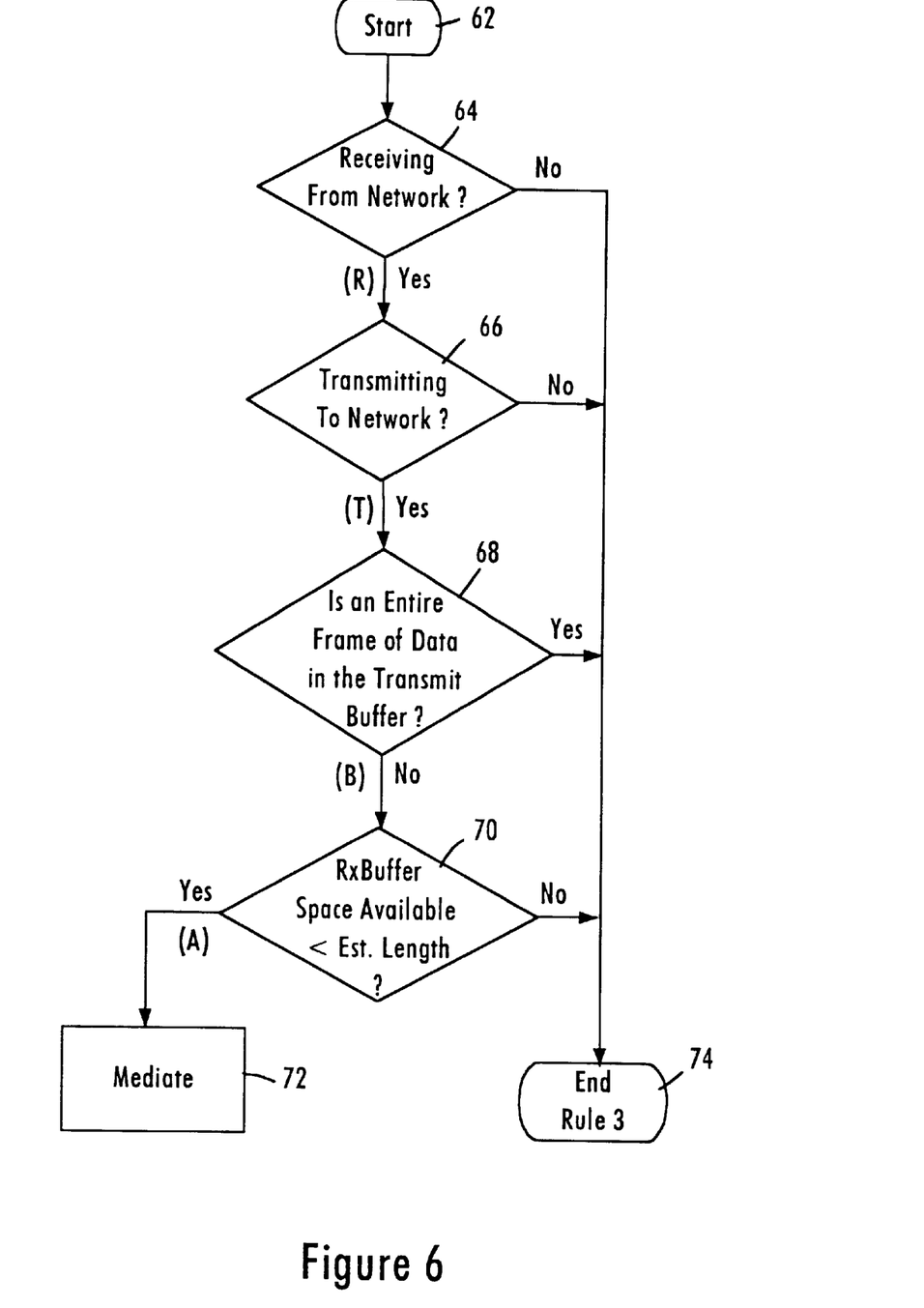
FIG. 6 is a flow diagram illustrating the third rule for selecting priority mediation.

As described above, the decision to allocate host computer resources to either the receive buffer 30 or the transmit buffer 32 is based upon the available space in the receive buffer 30, the amount of transmit data in the transmit buffer 32, and whether the MAC 22 is transmitting or receiving data packets. The logic for the three rules specifying a particular priority are illustrated in FIGS. 4, 5, and 6, respectively.

Figure 4:
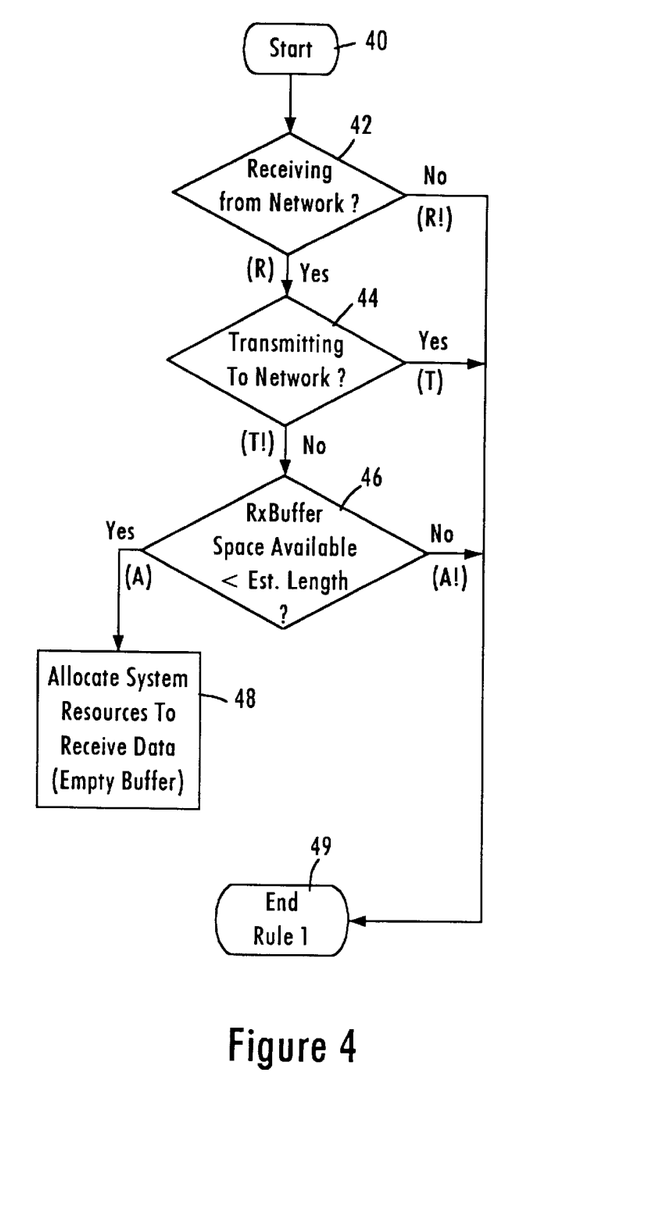
FIG. 4 is a flow diagram illustrating the first rule for determining to assign priority to receive data.

FIG. 4 illustrates the logic of Rule 1, which specifies when state 210 of FIG. 2 should be executed, namely granting priority to the receive buffer 30 in order to transfer data bytes stored in the receive buffer to system memory via the PCI bus 12. As shown in FIG. 4, the logic for Rule 1 begins in step 40, where the PCI BIU 16 checks in step 42 to determine whether a data packet is being received by the MAC 22. If PCI BIU 16 determines that no data packet is being received by the MAC 22 (logic R!), then PCI BIU 16 proceeds to step 49 to stop analysis under Rule 1. If in step 42 PCI BIU 16 determines that a data packet is being received by the MAC 22 (logic R), then PCI BIU 16 determines in step 44 whether a data packet is being transmitted by MAC 22 in step 44. During this time, transmit data may still be transferred to the transmit buffer 32 even though a data packet is not being transmitted by the MAC 22. If the MAC 22 is transmitting a data packet onto network media 14 (logic T), then PCI BIU 16 stops Rule 1 analysis in step 49. If in step 44 PCI BIU 16 determines that no data packet is being transmitted by the MAC 22 (logic T!) then PCI BIU 16 compares in step 46 the available buffer space of receive buffer 30 (RxBufferSpaceAvailable) to the estimated length of the current data packet received from network media 14.

If in step 46 PCI BIU 16 determines that the space available in receiver buffer 30 is less than the estimated length of the data packet such that overflow may occur (logic A), then PCI BIU 16 in step 48 allocates system resources first to empty receive buffer 30 by transferring data from the receive buffer 30 to system memory via PCI bus 12, shown in FIG. 2 as empty state 210.

Hence, the logic of Rule 1 executed by the PCI BIU 16 in FIG. 4 can be summarized as:

IF A AND R AND T! THEN EMPTY

As shown in FIG. 2, the PCI BIU 16 executes Rule 1 by moving to state I along path 204 upon detecting in step 42 that the MAC 22 is receiving data packets from the network (R). The PCI BIU 16 then proceeds to step 210 along path 214 upon determining in step 44 that the MAC 22 is not transmitting to the network (T!), and upon determining in step 46 that the available space in the receive buffer 30 is less than the estimated length (A). The state machine returns to the start state 200 from the empty state 210 upon completion of the transfer.

FIG. 5 is a flow diagram illustrating the logic of the Rule 2 to determine whether host system resources should be allocated to granting priority status to the transmit buffer 32, namely executing fill state 208 to transfer data from the system memory to the transmit buffer 32 via the PCI bus 12.

As illustrated in FIG. 5, PCI BIU 16 determines in step 52 whether a data packet is being transmitted by the MAC 22 to the network. If a data packet is being transmitted by the MAC 22 (logic T) such that underflow may occur, then PCI BIU 16 determines in step 54 whether at least one frame of the data to be transmitted on the network as a data packet is stored in transmit buffer 32. If an entire frame of the data packet is stored in transmit buffer 32 (logic B!), then system resources do not need to be allocated to transmit buffer 32 since there is no chance of underflow occurring, hence PCI BIU 16 terminates the rule at step 60. If an entire frame of the data packet is not in transmit buffer 32 (logic B) such that there is a chance of underflow occurring, PCI BIU 16 compares in step 56 the space available in receive buffer 30 (RxBufferSpace) to the estimated length in step 56. If PCI BIU 16 determines that the space available in receive buffer 30 is greater than the estimated frame size so that overflow probably will not occur (logic A!), then PCI BIU 16 allocates system resources to transmit data in step 58, which corresponds to state 208 of FIG. 2.

Hence, the logic of Rule 2 executed by the PCI BIU 16 in FIG. 5 can be summarized as follows:

IF A! AND B AND T THEN FILL

As shown in FIG. 2, the PCI BIU 16 implements Rule 2 by moving from the start state 200 to state II via path 206 upon detecting the transmission of data packets by the MAC 22 (T). The PCI BIU 16 then moves to the fill state 208 from state II along path 216 upon determining an entire frame of data is not in the transmit buffer 32 in step 54 (B), and determining the receive buffer space is less than the estimated length in step 56 (A!). Once the fill state 208 is reached, the PCI BIU 16 grants priority to the transmit buffer 32 in order to transfer data from the system memory to the transmit buffer 32. The state machine returns to the start state 200 upon completion of the transfer.

As shown in FIG. 2, state I moves to the don't care state 212 along path 218 if all the conditions of Rule 1 are not met. Similarly, state II moves to the don't care state 212 along path 220 if all of the conditions of Rule 2 are not met. However, additional mediation may be desirable in the event that there is both a chance of transmit overflow and a chance of transmit underflow.

FIG. 4 is a flow diagram illustrating the logic of Rule 3, where states I and II go to state III along paths 222 and 224, respectively, if there is both a chance of overflow of the receive buffer 30, and a chance of underflow of the transmit buffer 32. Hence, Rule 3 can be summarized as follows:

IF A AND B AND R AND T THEN GO TO STATE III FOR MEDIATION

FIG. 6 summarizes the logic of Rule 3, where the PCI BIU 16 determines the logical values of R, T, B, and A in steps 64, 66, 68, and 70, respectively. If the PCI BIU 16 determines all the values A, B, R, and T to be true, then the PCI BIU 16 executes mediation in step 72, also shown as state III.

Figure 7:
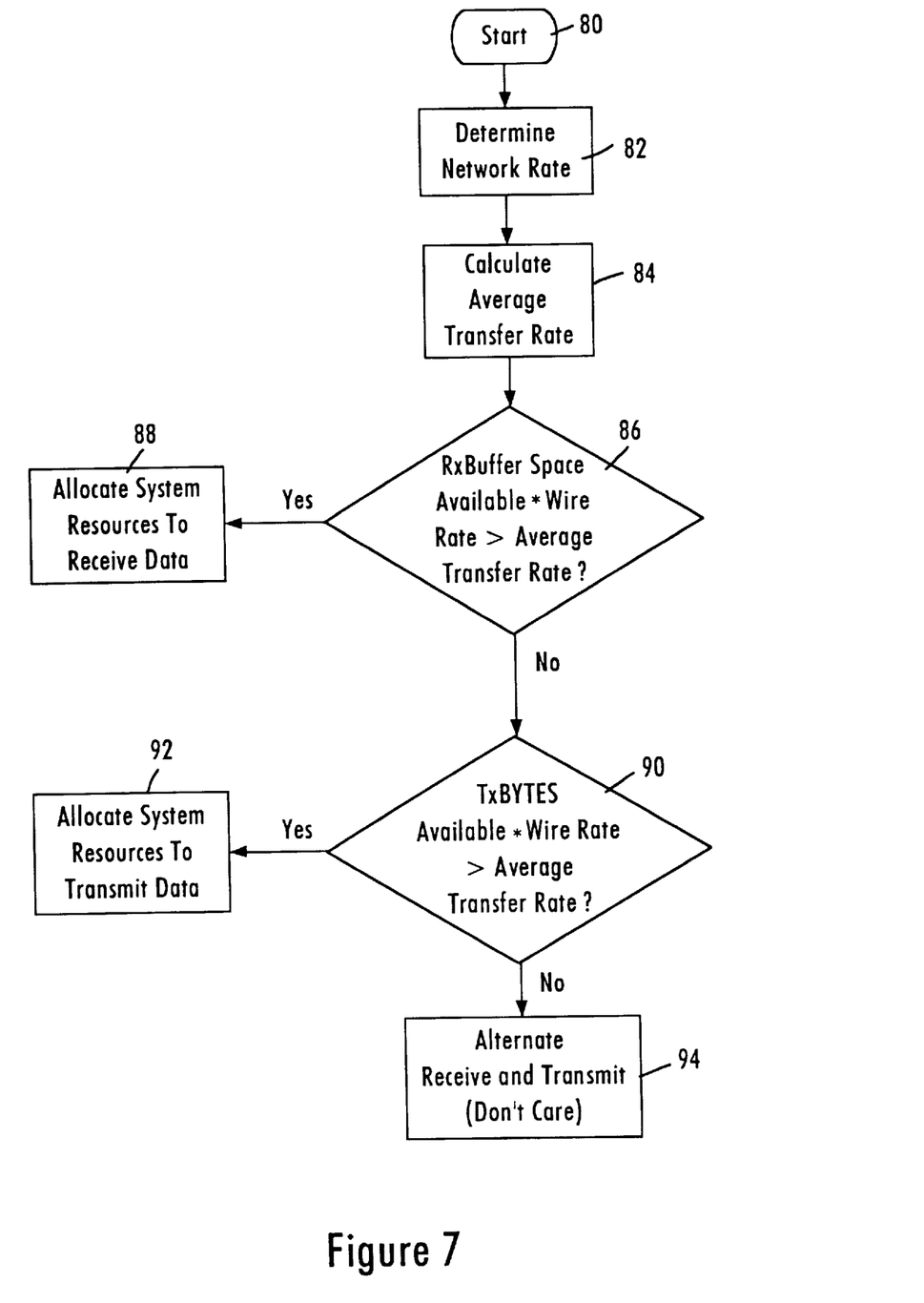
FIG. 7 is a flow diagram describing the mediation state of FIG. 2 for selectively assigning priority to either transmit or receive data.

FIG. 7 is a flow diagram illustrating in detail the mediation process in state III of FIG. 2. State III determines the relative probability of overflow and underflow by comparing the average transfer rate of the PCI bus 12 with the network data rate, also referred to as the "wire rate," and the space available in the receive buffer 30 and the number of transmit bytes stored in the transmit buffer 32.

As shown in FIG. 7, state III begins in step 82 by determining the network data rate, i.e., the wire rate, determined by network protocol. The PCI BIU 16 then calculates the average transfer rate of the PCI bus based upon burst and latency conditions on the PCI bus 12. After determining the average transfer rate in step 84, the PCI BIU 16 then compares the available space in the receive buffer 30 and the wire rate with the average transfer rate. If in step 86 the product of the available receive buffer space and the wire rate is greater than the average PCI bus transfer rate, indicating a probability of overflow, the PCI BIU 16 executes step 88 granting priority to the receive buffer 30, shown in FIG. 2 as path 226. The PCI BIU 16 returns from state 210 to the start state 200 after completing a transfer from the receive buffer 30 to the system memory via PCI bus 12.

If priority is not granted via path 226 in step 88, the PCI BIU 16 checks in step 90 if the number of transmit bytes stored in the transmit buffer 32 multiplied by the wire rate is greater than the average PCI bus transfer rate. If the number of stored transmit bytes multiplied by the wire rate is greater than the average transfer rate, indicating a probability of underflow, the PCI BIU 16 executes step 92 to allocate host system resources to the transmit buffer 32, shown in FIG. 2 as path 228.

However, if the PCI BIU 16 determines that the number of transmit bytes available multiplied by the wire rate is not greater than the average transfer rate, then the PCI BIU 16 returns to the don't care state 212 in step 94, indicated in FIG. 2 by path 230. As recognized in the art, the PCI BIU 16 in the don't care state 212 grants arbitrary access to either the transmit buffer or receive buffer, and returns to the start state 200 upon completion of a data transfer between the PCI bus and either the receive buffer 30 or the transmit buffer 32.

According to the present invention, priority is assigned and system resources allocated for each data transfer between the transmit or receive buffers and the system memory. Thus, the present invention can dynamically allocate host system resources as needed to minimize data overflow and underflow, as well as reducing latency of network interface 10.

Various modifications may be made to the disclosed embodiment while maintaining the advantageous features of the present invention. For example, the state diagram of FIG. 2 may be optimized to eliminate redundancies. In addition, the state diagram of FIG. 2 may be reduced by eliminating the arbitration state III to the don't care state 212.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. In a network interface having at least one memory buffer and transmitting and/or receiving data packets between a network and a host computer, a method for allocating host computer resources comprising:

first determining an occurrence of at least one of the transmitting and receiving of said data packets on the network by the network interface; and based on the determined occurrence, selectively allocating host computer resources for one of (1) storing first data bytes from the host computer into the memory buffer for transmission onto the network, and (2) removing second data bytes, obtained from the receiving of said data packets, from the memory buffer for transfer to the host computer, wherein the selectively allocating step comprises:

(a) detecting a data transfer condition between the buffer and the host computer;

(b) estimating a length of a data packet from the network;

(c) comparing space available for the second data bytes in the memory buffer to the estimated length of the data packet;

(d) selectively assigning priority of the host computer resources to said removing the second data bytes based on the comparing step and the first determining step identifying the occurrence of said receiving of said data packets coincident with the detected condition.

2. The method of claim 1, wherein the selectively assigning priority step comprises assigning priority to said removing the second data bytes in response to the first determining step identifying the occurrence of said receiving of said data packets and no occurrence of said transmitting of said data packets, and the comparing step determining the space available is less than the estimated length.

3. The method of claim 1, wherein the selectively assigning priority step comprises assigning a don't care priority in response to the comparing step determining the space available is greater than the estimated length.

4. The method of claim 1, wherein the selectively allocating step further comprises second determining if the memory buffer stores a complete frame of the first data bytes for a data packet to be transmitted on the network.

5. The method of claim 4, wherein the selectively assigning step comprises assigning a don't care priority in response to: (1) the second determining step determining the memory buffer does not store said complete frame, and (2) the first determining step identifying the occurrence of said transmitting of said data packets and the occurrence of said receiving of said data packets coincident with the data transfer condition.

6. The method of claim 4, further comprising:

determining an average transfer rate between the buffer and the host computer;

first comparing the average transfer rate with said space available for the second data bytes and a predetermined network rate;

second comparing the average transfer rate with a number of the first data bytes stored in the buffer and the predetermined network rate; and setting the priority to one of the removing the second data bytes and storing the first data bytes based on the first and second comparing steps.

7. The method of claim 6, wherein the average transfer rate determining step comprises calculating the average transfer rate based on prescribed bus conditions between the host computer and the memory buffer, the prescribed bus conditions including bus burst and bus latency.

8. The method of claim 6, wherein the priority setting step comprises:

setting the priority to the removing of the second data bytes if the space available for the second data bytes multiplied by the predetermined network rate is greater than the average transfer rate; and setting the priority to the storing of the first data bytes if the number of the first data bytes stored in the buffer multiplied by the predetermined network rate is greater than the average transfer rate.

9. The method of claim 1, wherein the step of estimating the length of the data packet comprises setting said length to equal a maximum prescribed frame size of said data packet.

10. The method of claim 1, wherein the step of estimating the length of the data packet comprises:

initially setting the estimated length of the data packet to a minimum frame size;

increasing the estimated length of the data packet in response to a detected overflow condition in the buffer.

11. In a network interface having at least one memory buffer and transmitting and/or receiving data packets between a network and a host computer, a method for allocating host computer resources, comprising:

first determining an occurrence of at least one of the transmitting and receiving of said data packets on the network by the network interface, and based on the determined occurrence, selectively allocating host computer resources for one of (1) storing first data bytes from the host computer into the memory buffer for transmission onto the network, and (2) removing second data bytes obtained from the receiving of said data packets, from the memory buffer for transfer to the host computer, wherein the selectively allocating step comprises:
- (a) detecting a data transfer condition between the buffer and the host computer;
- (b) estimating a length of a data packet from the network;
- (c) comparing space available for the second data bytes in the memory buffer to the estimated length of the data packet;
- (d) second determining if the memory buffer stores a complete frame of the first data bytes for a data packet to be transmitted on the network; and
- (e) selectively assigning priority of the host computer resources to said storing the first data bytes based on the comparing step, and the first determining step identifying the occurrence of said transmitting of said data packets coincident with the detected condition.

12. The method of claim 11, wherein the selectively assigning priority step comprises setting the priority to said storing of the first data bytes if the memory buffer does't not store said complete frame of the first data bytes and the space available for the second data bytes in the memory buffer is greater than the estimated length of the data packet.

13. A network interface comprising:
- a computer bus interface configured for exchanging data frames with a host computer, each of the data frames comprising a plurality of data bytes;
- a network bus interface configured for outputting data packets carrying first data bytes onto a network medium at a network transmission rate and receiving data packets carrying second data bytes from the network medium;
- at least one memory buffer connected for receiving the first data bytes from the computer bus interface and the second data bytes from the network bus interface, the memory buffer having predetermined byte storage requirements before output of the first and second data bytes, respectively, and
- a priority controller selectively allocating host computer resources to one of (1) transfer the first bytes from the host computer to the memory buffer via the computer bus interface, and (2) transfer the second bytes from the memory buffer to the host computer via the memory bus, based on detection of transmission and/or reception of data packets by the network bus interface and the respective number of first and second data bytes stored in the memory buffer, further comprising:
  - means for determining a buffer space available for the second bytes from the network bus interface;
  - means or determining an estimated data packet frame size, the priority controller selectively allocating the host computer resources based on the estimated data packet frame size and the buffer space available for the second bytes.

14. The network interface of claim 13, wherein the frame size is a prescribed maximum frame size.

15. The network interface of claim 13, wherein the means for determining an estimated data packet frame size comprises an accumulator increasing the estimated data packet frame size in response to a detected overflow condition in the buffer.

16. The network interface of claim 13, wherein the priority controller allocates the host computer resources to transfer the first bytes from the host computer to the memory buffer if: (1) the network bus interface is transmitting the data packets, (2) the buffer space available for the second bytes is greater than the estimated data packet frame size, and (3) the buffer stores first data bytes less than the corresponding byte storage requirement.

* * * * *

UNITED STATES PATENT AND TRADEMARK OFFICE
CERTIFICATE OF CORRECTION

PATENT NO. : 5,933,413
DATED : August 3, 1999
INVENTOR(S) : Shashank Merchant, et al.

It is certified that error appears in the above-identified patent and that said Letters Patent is hereby corrected as shown below:

In the Claims, in the Claim 1, line 41, insert "," after the word "resources", and in Claim 12, line 25, after word "buffer", replace "does't" with --does--.

Signed and Sealed this

First Day of February, 2000

Attest:

Q. TODD DICKINSON

*Attesting Officer*   *Acting Commissioner of Patents and Trademarks*